United States Patent [19]

Gurwicz et al.

[11] 3,757,140

[45] *Sept. 4, 1973

[54] COMMUTATION CIRCUITS

[75] Inventors: David Gurwicz; Albert E. Sloan, both of Gateshead, County Durham, England

[73] Assignees: Ransomes Sims & Vefferies Limited, Ipswich; Seucon Engineering Limited, Gateshead, both of England

[*] Notice The portion of the term of this patent subsequent to July 27, 1970, has been disclaimed.

[22] Filed: May 20, 1971

[21] Appl. No.: 145,413

Related U.S. Application Data

[62] Division of Ser. No. 796,382, Feb. 4, 1969, Pat. No. 3,596,154.

[52] U.S. Cl. ............ 307/252 M, 307/269, 307/293, 318/138, 321/45 C

[51] Int. Cl.. H03k 17/72, H02k 29/02, H03k 17/28

[58] Field of Search .................... 307/252 M, 252 P, 307/293, 284, 305; 318/138, 254; 321/45 R, 45 C, 43, 44

[56] References Cited

UNITED STATES PATENTS

| | | | |
|---|---|---|---|
| 3,321,697 | 5/1967 | Etter | 321/45 C |
| 3,614,586 | 10/1971 | King | 307/252 M X |
| 3,535,559 | 10/1970 | Adams | 307/252 M |
| 3,492,557 | 1/1970 | Brown | 318/345 X |
| 3,146,356 | 8/1964 | Kidwell et al. | 307/252 M |
| 3,242,352 | 3/1966 | Long | 307/252 M |
| 3,303,416 | 2/1967 | Paice et al | 307/252 M X |
| 3,354,322 | 11/1967 | Eastop | 307/252 M X |
| 3,365,640 | 1/1968 | Gurwicz | 307/252 M X |
| 3,388,310 | 6/1968 | Etter | 321/16 X |
| 3,496,444 | 2/1970 | King et al. | 321/43 X |
| 3,548,216 | 12/1970 | Burch | 307/252 M |

FOREIGN PATENTS OR APPLICATIONS

| | | | |
|---|---|---|---|
| 1,051,149 | 12/1966 | Great Britain | 307/252 M |

OTHER PUBLICATIONS

G. E. SCR Manual 4th Edition, pgs. 163–164, 3/1967.

*Primary Examiner*—John W. Huckert
*Assistant Examiner*—L. N. Anagnos
*Attorney*—Ira Milton Jones

[57] ABSTRACT

Commutation circuits for simultaneously commutating a plurality of main semi-conductor switching devices, each adapted to effect pulsed connection of an electrical supply to a load individual to the semi-conductor switching device, the simultaneous commutation of the switching devices facilitating variation of the mean power supplied to one relatively to the mean power supplied to another of the different loads.

5 Claims, 9 Drawing Figures

INVENTORS
David Gurwicz
Albert E. Sloan
By
Attorneys

INVENTORS
David Gurwicz
Albert E. Sloan
BY [signature]
ATTORNEY

INVENTORS
David Gurwicz
Albert E. Sloan
BY [signature]
ATTORNEY

INVENTORS
David Gurwicz
Albert E. Sloan
BY Ira Milton Jones
ATTORNEY

INVENTORS
David Gurwicz
Albert E. Sloan

INVENTORS
David Gurwicz
Albert E. Sloan
BY Ira Milton Jones
ATTORNEY

INVENTORS
David Gurwicz
Albert E. Sloan
BY Ira Milton Jones
ATTORNEY

COMMUTATION CIRCUITS

This application is a division of our copending U.S. Pat. application Ser. No. 796,382, filed Feb. 4, 1969, now U.S. Pat. No. 3,596,154.

This invention relates to commutation circuits. More particularly the invention relates to such circuits for simultaneously commutating a plurality of main semi-conductor switching devices each adapted effect repetitive connection to and disconnection from an electrical supply of a load individual to the semi-conductor switching device. By effecting simultaneous commutation of said switching devices variation of the mean power supplied to one relatively to another of the different loads is facilitated.

The present invention consists in a commutation circuit for simultaneously commutating a plurality of main semi-conductor switching devices each adapted to effect repetitive connection to and disconnection from an electrical supply of a load individual to the semi-conductor switching device, comprising a commutating capacitor, means for inductively charging said capacitor and further semi-conductor switching means whereby said commutating capacitor can be connected to the main semi-conductor switching devices when the latter are conducting and thereby reverse bias and commutate said main devices, the discharge path of the commutating capacitor during commutation including the loads.

In one form of the invention a master electrical oscillator is provided for supplying output trains of electrical pulses by way of respective pulse delay circuits to the main thyristor switching devices, there being further provided means for varying the delay of at least one of the delay circuits, the arrangement being such that on varying the delay of one relatively to another of the delay circuits, the switching on of the main thyristor associated with said one of the delay circuits takes place at a different time from the switching on of the main thyristor associated with said other of the delay circuits so that on simultaneous commutation of the main thyristors the main thyristors have conducted for different periods.

The invention will now be described, by way of example, with reference to the accompanying drawings, in which.

Throughout the drawings like parts have been accorded the same references.

Figure 1:
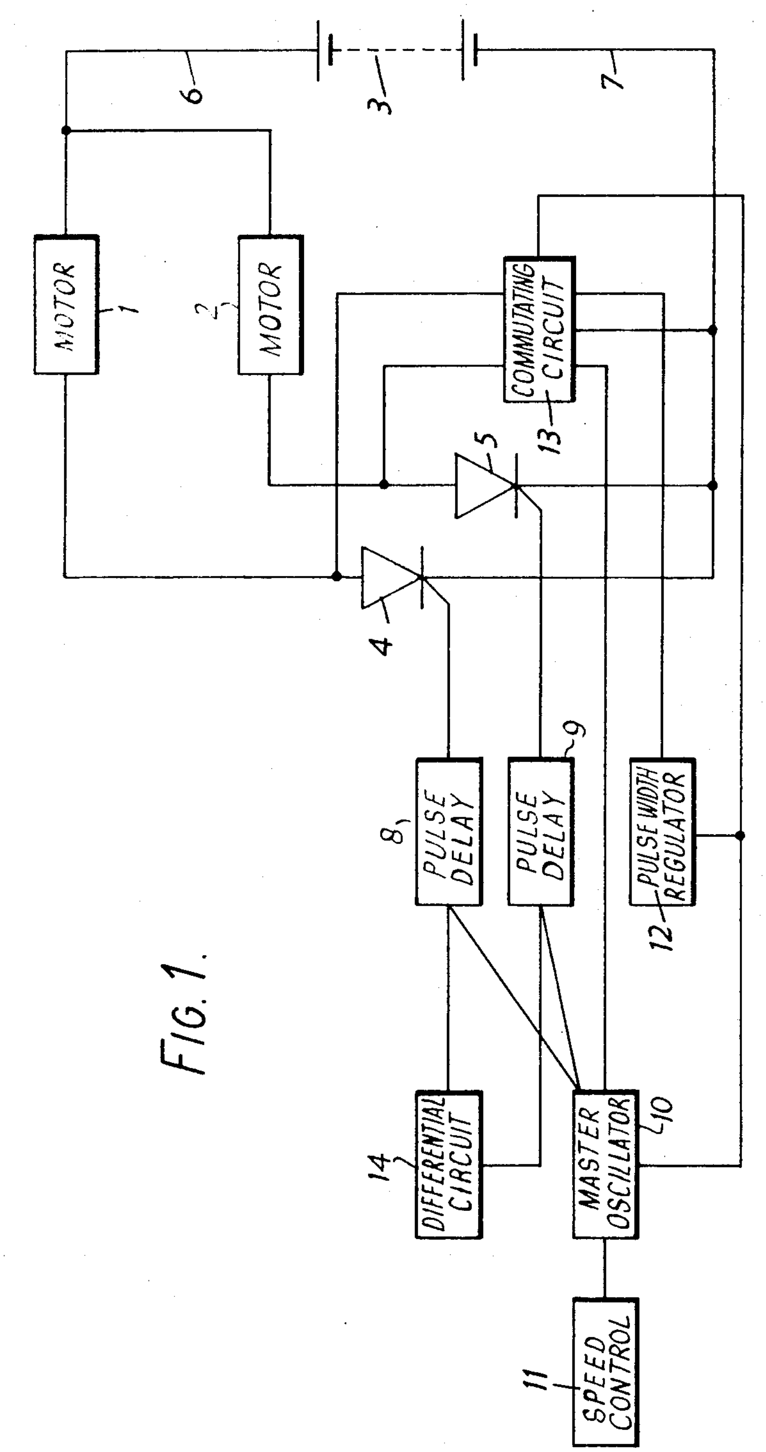
FIG. 1 is a block schematic diagram of an electrically operated drive system employed for the control of D.C. electric motors of a battery-powered vehicle.

Referring first to FIG. 1, an electrically-operated drive system is employed for the control of D.C. series motors 1 and 2 of a vehicle powered by a battery 3. In electrical series relationship with the motors 1 and 2 are respective main thyristors 4 and 5, each main thyristor and its associated motor being connected in series to the positive lead 6 and negative lead 7 of the battery. The gate electrode of each main thyristor 4 and 5 is connected by way of a pulse delay circuit 8 and 9 to the output connections of a master oscillator 10. The master oscillator 10 thus supplies rectangular electrical impulses by way of the pulse delay circuits 8 and 9 respectively to the main thyristors 4 and 5 in series With the vehicle motors. A first control means comprising a speed control 11 is provided which supplies a variable voltage to the master oscillator so as to vary the output pulses from the master oscillator and thereby vary the duration of the time of connection to the battery to the time of disconnection from the battery of each of the motors. A pulse width regulator or turn-off oscillator 12 is provided which actuates a commutating circuit 13 to effect switching off of the main thyristors 4 and 5. It will be noted that a feed back lead is provided from the commutating circuit 13 to the master oscillator 10 and pulse width regulating circuit or turn-off oscillator 12.

The delay caused by either or both of the pulse delay circuits 8 and 9 in the supply of pulses from the master oscillator 10 to the thyristors 4 and 5 can be varied by means of a second control means which includes a differential circuit 14 which consists of a variable potentiometer, the adjustment of which effects the requisite variation of the delay caused by circuits 8 and 9. In the arrangement of FIG. 1 the potentiometer 14 acts to change the delay either of delay circuit 8 or delay circuit 9 whilst the delay of the other circuit is maintained constant. The speed control element 11 is operated by the accelerator pedal of the vehicle whilst the differential circuit 14 is operated by rotation of the steering wheel of the vehicle. Depression of the accelerator pedal acts to increase the frequency of pulses supplied to the main thyristors 4 and 5 and thereby increase the speed of the vehicle whilst rotation of the steering wheel adjusts the differential circuit 14 so as to increase the delay of pulses supplied to one or other of the thyristors 4 and 5.

As hereinafter fully explained the commutation circuit 13 is operated by the circuit 12 simultaneously to commutate the thyristors 4 and 5 and, therefore, a delay in the pulses supplied from either of the pulse delay circuits 8 or 9 to the main thyristors 4 and 5 has the effect of reducing the mean current through the motor connected with the relevant main thyristor; that motor accordingly slows down and the vehicle moves in a curved path with the slowed down motor operating the drive wheel of the vehicle at the inside of the curved path. It will be apparent that the speed control 11 varies the frequency of pulses from the master oscillator and therefore varies the frequency of pulses supplied to the gate electrode of the main thyristors 4 and 5, these pulses being simultaneously commutated through operation of the pulse width regulator. Instead, however, of varying the frequency of pulses it is possible to use pulses of fixed frequency and variable pulse width. To this end the master oscillator would deliver to the delay circuits pulses of constant frequency which would be delivered subject to the delay caused by the delay circuits to the gate electrodes of thyristors 4 and 5 and a predetermined time after the initiation of a pulse from the master oscillator to the delay circuits, the pulse width regulator would operate simultaneously to commutate thyristors 4 and 5.

Figure 2:
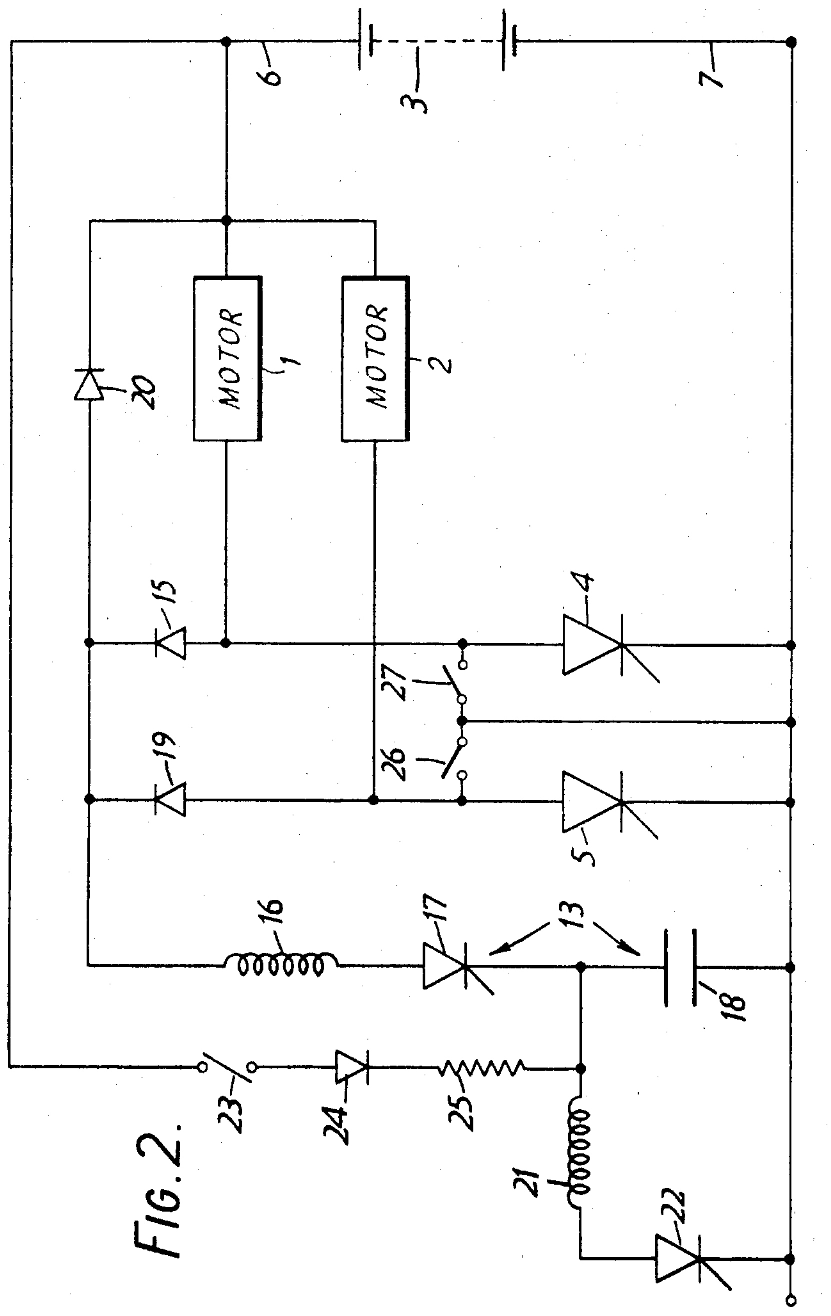
FIG. 2 is a diagram illustrating the principal components of the power circuit of the drive system of FIG. 1.

In FIG. 2 the main components of the power circuit and commutating circuit are illustrated. It will be noted that the main thyristor 4 is shunted by a series path comprising diode 15, inductor 16, thyristor 17 and commutating capacitor 18 whilst the main thyristor 5 is shunted by a series path comprising diode 19 in series with the components 16 to 18. The diodes 15 and 19 are also disposed in series with the anode of a diode 20, the cathode of which is connected to the positive lead 6 of the battery. Accordingly, the diodes 15 and 20 form the usual free-wheel diode path for the motor 1 which maintains current flow through the motor during the interval between commutation of the thyristor 4 and the next pulse to the gate electrode thereof. The diode system 19 and 20 similarly acts as a free-wheel path for the motor 2. Shunting the commutating capacitor 18 is a further inductor 21 and thyristor 22. Connected between the positive lead 6 of the battery and the common point of the capacitor 18 and thyristor 17 is a series path containing the key switch 23 of the vehicle, a diode 24 and a resistor 25.

At the commencement of operation, the closure of the key switch 23 causes the capacitor 18 to charge with its top plate positive. A pulse supplied from the master oscillator at the gate electrode of thyristor 22 than has the effect of reverse charging the capacitor so that the bottom plate thereof becomes positive with respect to the top plate. The tendency for the charge on the capacitor to reverse again in oscillatory manner has the effect of commutating thyristor 22. The supply of pulses to the gate electrodes of thyristors 4 and 5 from the master oscillator by way of the delay circuits 8 and 9 cause current flow through the motors 1 and 2 until a firing pulse is supplied to the gate electrode of thyristor 17 by the pulse width regulating circuit 12 whereupon thyristors 4 and 5 are commutated, the capacitor 18 being discharged via the battery 3 and then forward charged via the motors 1 and 2, the diodes 15 and 19, the inductor 16 and the thyristor 17. The forward charging of the capacitor proceeds by virtue of the presence of the inductor 16 to a level a little in excess of battery voltage, at which point the current flow through the thyristor 17 falls below the hold value for that thyristor which is accordingly commutated. A subsequent pulse supplied from the master oscillator to the gate of thyristor 22 causes reversal of the charge on the capacitor 18, the master oscillator also supplying pulses via the delay circuits 8 and 9 to the gate electrodes of the main thyristors to trigger the latter into conduction and the cycle of operation thus continues.

Shorting contactors 26 and 27 are provided which, when the mean current flow through the motors 1 and 2 and their associated main thyristors 4 and 5 is a maximum, are closed to give continuous current flow through the motors. This occurs at a predetermined depression of the accelerator pedal and these contactors are automatically opened as the pedal is raised above said predetermined depression.

Figure 3:
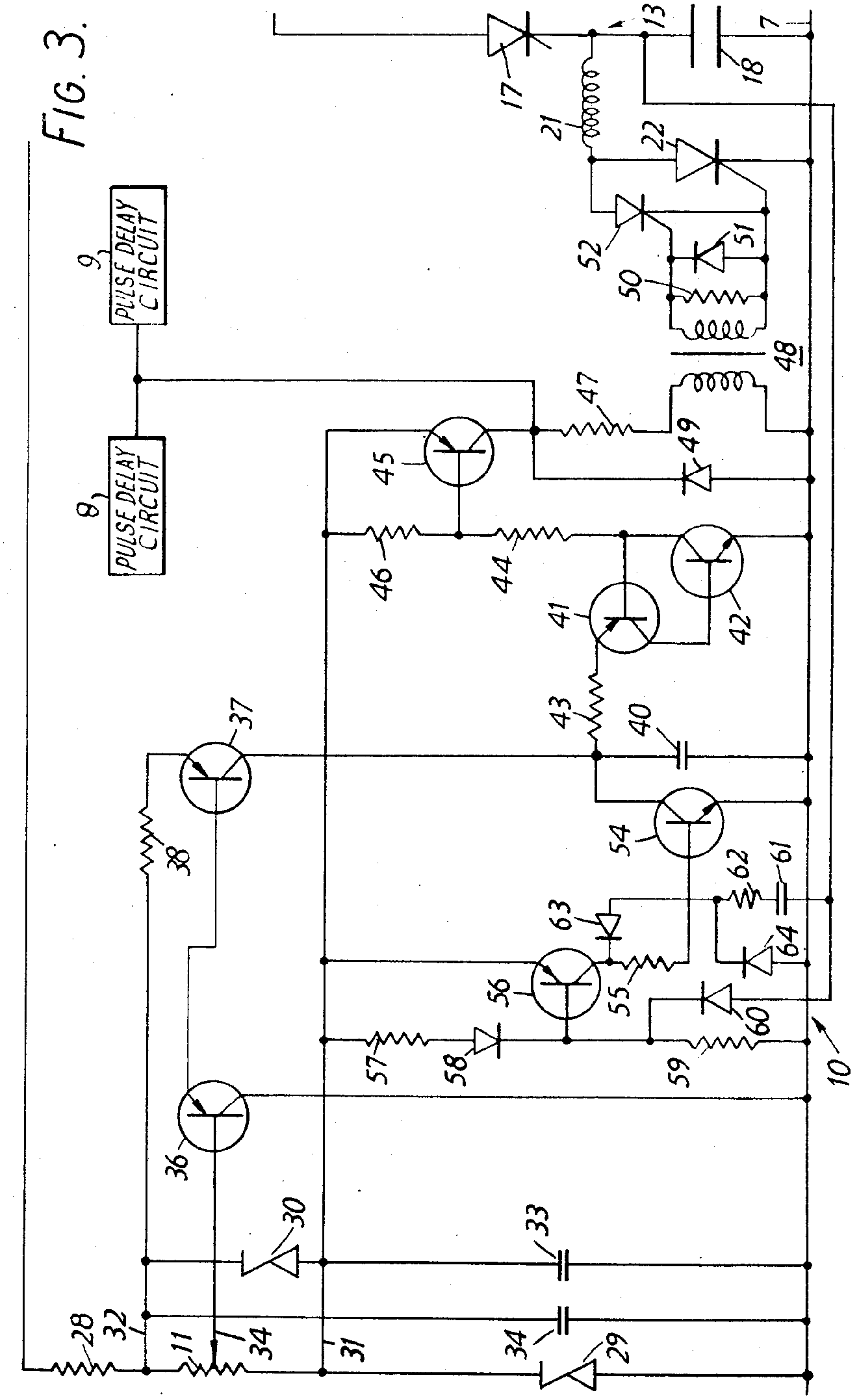
FIG. 3 is a circuit diagram of the principal components of a master oscillator employed in the system of FIG. 1, this diagram also including a speed control employed in the system of FIG. 1.

Referring now to FIG. 3 which illustrates the principal components of the master oscillator 10, it will be noted that connected across the positive and negative leads 6 and 7 of the battery is a resistor 28, the speed control resistor 11 and a zener diode 29. A further zener diode 30 shunts the speed control resistor 11. The zener diodes 29 and 30 serve to stabilise the voltages respectively of rails 31 and 32, between each of which rails and the negative lead of the battery are capacitors 33 and 34 which absorb any voltage surges which tend to occur at the rails 31 and 32.

Wiper arm 34 of the speed control resistor 11 is positioned by the foot pedal of the vehicle and applies a potential to the base of p.n.p. transistor 36. The collector of this transistor is connected to the negative lead 7 of the battery whilst the emitter is connected to the base of p.n.p. transistor 37, the emitter of which is connected via a resistor 38 to the voltage rail 32. The collector of transistor 37 is connected to one side of a capacitor 40, the other side of which is connected to the negative lead 7 of the battery. As the voltage difference between the wiper arm 34 and the stabilised voltage rail 32 increases so the potential at the base of the transistor 36 becomes increasingly negative with respect to the rail 32. The potential at the base of transistor 36 controls the potential at the emitter thereof and therefore the potential at the base of transistor 37 so that this latter transistor becomes more heavily conducting as the potential at the wiper arm 34 falls further below the potential at the rail 32. As the transistor 37 becomes more heavily conducting so the capacitor 40 charges more repidly. The capacitor 40 together with p.n.p. transistor 41 and n.p.n. transistor 42 forms a relaxation oscillator. To this end, the common point of the capacitor 40 and collector of transistor 37 is connected via a resistor 43 to the emitter of transistor 41, the collector of which is connected to the base of transistor 42 whilst the base of transistor 41 is connected to the collector of transistor 42, the emitter of the latter transistor being connected to the negative lead 7 of the battery. The common point of the base of transistor 41 and the collector of transistor 42 is connected by way of a resistor 44 to the base of p.n.p. transistor 45, the base of this latter transistor being further connected by means of resistor 46 to the stabilised voltage rail 31. The emitter of transistor 45 is directly connected to the stabilised voltage rail 31 whilst the collector thereof is connected via resistor 47 and the primary winding of a transformer 48 to the negative lead 7 of the battery. Shunting the resistor 47 and the primary winding of transformer 48 is a diode 49. The secondary winding of transformer 48 is shunted by a resistor 50 and also by a diode 51, the output of the secondary winding of the transformer 48 being applied between the gate and cathode electrodes of a thyristor 52, the anode of which thyristor is connected to the anode of the transistor 22 for reversing charge on the commutating capacitor 18. An output of the transistor 45 is additionally taken to each of the delay circuits 8 and 9.

At a predetermined level of charge on the capacitor 40, the emitter of transistor 41 becomes positive with respect to the base thereof so that transistor 41 commences to conduct and base current flows in transistor 42. The conduction of transistors 41 and 42 rapidly discharges the capacitor 40 with the result that the base of transistor 45 is driven negative and a current pulse is conducted through the transistor 45 which provides an output pulse which is supplied to each of the delay circuits 8 and 9 and also is applied to the primary winding of transformer 48. The consequential pulse appearing in the secondary winding of transformer 48 renders the thyristor 52 conducting with the result that a pulse is applied to the gate electrode of thyristor 22 turning on that thyristor and thereby effecting reversal of charge on the capacitor 18. It will be apparent that the rate at which pulses are applied to the gate electrode of thyristor 22 is governed by the rate of charging of the capacitor 40. Accordingly, it will be seen that the location of the wiper arm 34 determines the pulsing frequency of the master oscillator.

It is important that the capacitor 40 should not charge until the commutating capacitor is fully forward charged. To ensure this there is provided an n.p.n. transistor 54, the collector emitter path of which is connected in parallel with the capacitor 40. The base of transistor 54 is connected by way of a resistor 55 to the collector of a p.n.p. transistor 56, the emitter of which is connected to the stabilised voltage rail 31 and the base of which is connected by way of a resistor 57 and diode 58 to the voltage rail 31 and by way of a resistor 59 to the negative lead 7 of the battery. The common connection of the cathode of thyristor 17 and commutating capacitor 18 is connected via a diode 60 to the base of transistor 56, and via series connected capacitor 61, resistor 62 and diode 63 to the collector of transistor 56. A diode 64 is connected between the negative lead 7 of the battery and the common point of resistor 62 and diode 63. As the commutating capacitor 18 commences to forward charge the transistor 56 remains in a conducting condition until the potential at the base thereof exceeds the potential of the stabilised voltage rail. Whilst the transistor 56 is conducting, base current is fed into the transistor 54 which therefore short-circuits capacitor 40 preventing the latter from charging. When the transistor 56 is rendered non-conducting, the components 61, 62 and 63 maintain the transistor 54 in a conducting condition until the capacitor 18 is fully forward charged at which point the transistor 54 becomes non-conducting thereby permitting the capacitor 40 to charge.

Figure 4:
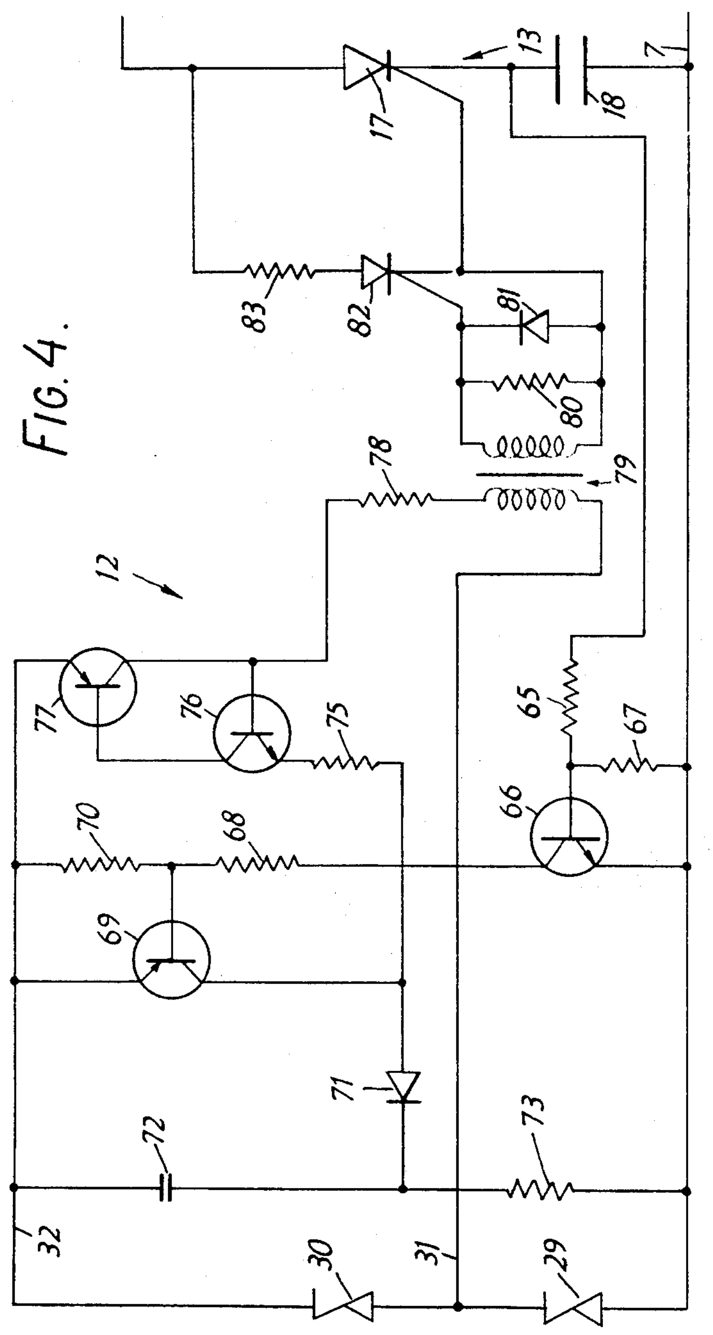
FIG. 4 is a circuit diagram illustrating the principal components of a pulse width regulator employed in the system of FIG. 1.

Referring now to FIG. 4 which illustrates the pulse width regulator, the cathode of thyristor 17 is connected by way of a resistor 65 to the base of n.p.n. transistor 66, the base of this transistor being further connected by resistor 67 to the negative lead 7 of the battery. The emitter of transistor 66 is connected directly to the negative lead 7 of the battery whilst the collector thereof is connected via a resistor 68 to the base of p.n.p. transistor 69. A further resistor 70 connects the base of transistor 69 to the stabilised voltage rail 32. The emitter collector path of transistor 69 is connected in series with a diode 71 across a capacitor 72 the latter being connected in series with a resistor 73, the series path of the capacitor 72 and resistor 73 being connected between the stabilised voltage rail 32 and the negative lead 7 of the battery. The collector of transistor 69 is connected via resistor 75 to the emitter of n.p.n transistor 76, the collector of which is connected to the base of p.n.p. transistor 77, the collector of this latter transistor being connected to the base of transistor 76. The emitter of transistor 77 is connected directly to the stabilised voltage rail 32. The common connection of the collector of transistor 77 and the base of transistor 76 is connected via a resistor 78 to one end of the primary winding of a transformer 79, the other end of the primary winding being connected to the stabilised voltage rail 31. The secondary of transformer 79 is shunted by a resistor 80 and by diode 81 and is further connected between the gate and cathode electrodes of a thyristor 82, the anode of which connects via a resistor 83 with the anode of thyristor 17 whilst the cathode of thyristor 82 is connected to the gate electrode of thyristor 17.

The operation of the pulse width regulating circuit 12 can now be appreciated. So long as the common connection of the cathode of thyristor 17 with the commutating capacitor 18 is at a positive potential the transistor 66 is held in a conducting condition and this keeps transistor 69 in a conducting state so that the capacitor 72 is short-circuited and thereby prevented from charging. When thyristor 22 is fired into conduction the charge on capacitor 18 reverses so that the common connection of the cathode of thyristor 17 and commutating capacitor 18 goes negative with respect to the negative lead 7 of the battery and the transistor 66 is thus rendered non-conducting with the result that transistor 69 also ceases to conduct. Capacitor 72 now begins to charge in accordance with the time constant of that capacitor and resistor 73. When the potential at the junction of capacitor 72 and resistor 73 falls to a predetermined point below the potential of the stabilised voltage rail 31, i.e., the potential at the base of transistor 76, transistor 76 commences to conduct and turns on transistor 77 so that the capacitor 72 is rapidly discharged and a current pulse flows through the primary winding of transformer 79. The voltage which in consequence appears at the secondary winding of transformer 79 causes thyristor 82 to be rendered conducting and this in turn causes a firing pulse to be applied to the gate electrode of thyristor 17. Simultaneous commutation of the main thyristors 4 and 5 therefore occurs and the commutating capacitor is once again forward charged. It will be seen, therefore, that the master oscillator in its action of rendering conducting the thyristor 22 has in effect synchronised the pulse width regulator 12 to commutate the main thyristors 4 and 5 a given time after the master oscillator has delivered a pulse to the transformer 48. The given time between the initiation of conduction of thyristor 22 and the commutation of the main thyristors 4 and 5 by reason of thyristor 17 being rendered conducting is determined by the time constant of capacitor 72 and resistor 73 of the pulse width regulating circuit.

Figure 5:
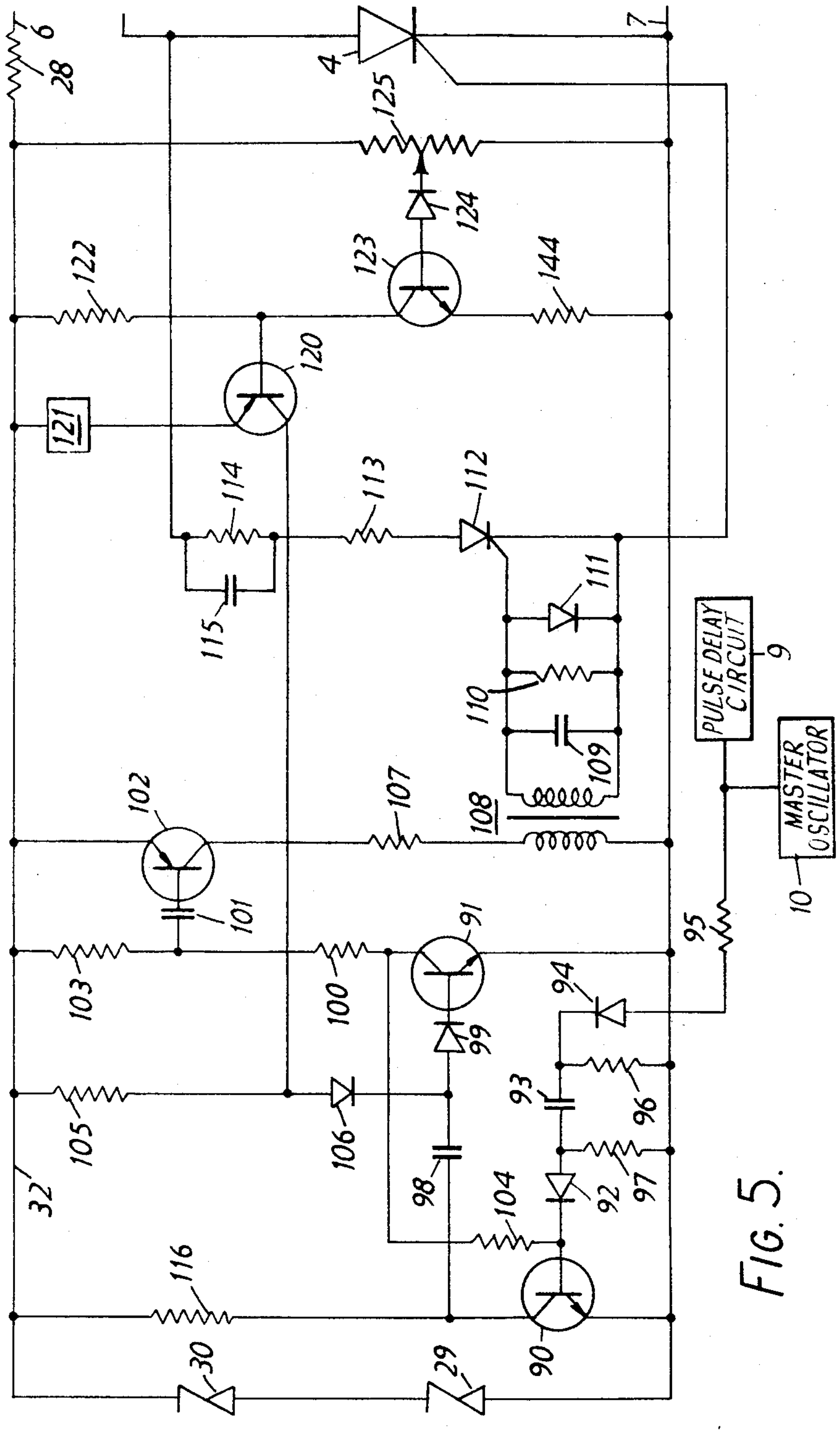
FIG. 5 is a circuit diagram of one of two delay circuits employed in the system of FIG. 1, this diagram also including elements of a differential unit forming part of the system of FIG. 1.

Referring now to FIG. 5 which illustrates the pulse delay circuit 8, the latter being similar to the pulse delay circuit 9. Transistors 90 and 91 which are n.p.n. transistors form a monostable multi-vibrator. To this end, the emitter of transistor 90 is directly connected to the negative lead 7 of the batter whilst the collector thereof is connected via resistor 116 to the stabilised voltage rail 32. The base of transistor 90 has connected in series therewith diode 92, capacitor 93, diode 94 and resistor 95, the latter resistor being connected to the collector of transistor 45 in the master oscillator circuit. The common point of capacitor 93 and diode 94 is connected via resistor 96 to the negative lead 7 of the battery and the common point of the capacitor 93 and diode 92 is connected via resistor 97 to the negative lead 7 of the battery. The collector of transistor 90 is connected via capacitor 98 and diode 99 to the base of transistor 91, the emitter of transistor 91 being directly connected to the negative lead 7 of the batter whilst the collector thereof is connected via resistor 100 and capacitor 101 to the base of p.n.p. transistor 102. The common connection of capacitor 101 and resistor 100 is connected via a resistor 103 to the stabilised voltage rail 32. The collector of transistor 91 is connected by way of a resistor 104 with the base of transistor 90. Also, tbe common connection of capacitor 98 and diode 99 is connected to the stabilised voltage rail 32 by way of a resistor 105 and a diode 106. The emitter of transistor 102 is directly connected to the stabilised voltage rail 32 whilst the collector of that transistor is connected via a resistor 107 and the primary winding of a transformer 108 to the negative lead 7 of the battery. The secondary winding of transformer 108 which is shunted by capacitor 109, resistor 110 and diode 111 is connected between the gate and cathode electrodes of thyristor 112, the anode of which connects via resistor 113 and parallel connected resistor 114 and capacitor 115 with the anode of thyristor 4, whilst the cathode of thyristor 112 is connected with the gate electrode of thyristor 4.

The operation of the delay circuit can now be appreciated. In the static condition of the multi-vibrator formed by the transistors 90 and 91, transistor 91 is held in conduction due to the positive feed into its base via resistor 105. Because of the conduction of transistor 91 the potential at the collector thereof is substantially that of the negative side of the battery so that the potential at the base of the transistor 90 is sufficiently negative to hold transistor 90 in a non-conducting mode. When the master oscillator generates an output pulse this is transmitted by way of resistor 95, diode 94, capacitor 93 and diode 92 into the base of transistor 90. This pulse is a positive-going pulse and it has the effect of momentarily turning the transistor 90 into full conduction. As the capacitor 98 was fully charged via resistor 116 when the transistor 91 was conducting, the effect of rendering transistor 90 conducting is to bring the potential of the collector of transistor 90 effectively to that of the negative side of the battery so that the common point of diodes 106, and 99 and the capacitor 98 is driven negative with respect to the negative side of the battery. Transistor 91 is thus turned off. The potential of the collector of transistor 91 thus turns positive and drives the base of transistor 90 positive so that transistor 90 is fully turned on. Because of the positive feed into the base of transistor 90, via the resistor 103, 100 and 104. The monostable multi-vibrator has now reverted to its alternative state with transistor 90 in full conduction and transistor 91 in a non-conducting condition. This state is stable as long as capacitor 98 maintains its charge, that is to say as long as the potential appearing at the junction of the diodes 99 and 106 remains negative with respect to the negative side of the battery. The time constant which governs the charging of capacitor 98 to the point where the junction of diodes 99 and 106 is no longer negative with respect to the negative side of the battery is determined by the capacitor 98 and the effective resistance appearing across resistance 105. At the termination of this time constant, the potential at the junction of diodes 106 and 99 rises to a level at which transistor 91 recommences to conduct. When this happens, the positive feed via resistors 103, 100 and 104 into the base of transistor 90 ceases because the collector of transistor 91 has been brought effectively to the potential of the negative side of the battery so that transistor 90 is switched off. When the transistor 91 commences once again to conduct, the potential at the junction of resistors 100 and 103 falls sharply so that a pulse is transmitted by the capacitor 101 into the base of transistor 102. Transistor 102 is thus momentarily turned into a conducting state and a pulse of current flows through the primary winding of transformer 108. The voltage pulse which thus appears in the secondary winding of transformer 108 thus renders thyristor 112 conducting wih the result that a pulse is applied to the gate electrode of thyristor 4, turning that thyristor into a conducting condition. A sumilar action occurs in the case of pulse delay circuit 9.

It is apparent therefore that each pulse delay network 8 and 9 delivers a pulse to render the associated main thyristor 4 or 5 conducting a given time after the initiation pulse from the master oscillator and the time delay between the initiation pulse from the master oscillator and the delivery of a pulse by the delay circuit 8 or the delay circuit 9 is given by a time constant, in the case of delay circuit 8 of capacitor 98 and the effective impedance appearing across the resistor 105 and in the case of delay circuit 9 the corresponding circuit elements. The effective impedance appearing across resistor 105 and the corresponding resistor of the delay circuit 9 is governed by the action of the differential circuit 14.

That part of the differential circuit 14 which acts on the delay circuit 8 comprises a transistor 120 of the p.n.p. type, the collector of which is connected to the junction of resistor 105 and diode 106 whilst the emitter of transistor 120 is connected via a non-linear network 121 to the stabilised voltage rail 32. The base of transistor 120 is connected via a resistor 122 to the stabilised voltage rail 32 and is further connected to the collector of an n.p.n. transistor 123, the emitter of which is connected via a resistor 144 with the negative lead 7 of the battery. The base of transistor 123 is connected via diode 124 to the wiper arm of a steering potentiometer 125 connected between the stabilised voltage rail 32 and the negative lead 7 of the battery.

It will be seen that if transistor 120 is in full conduction the effective resistance appearing across resistance 105 is the parallel combination of resistor 105 and non-linear network 121. If transistor 120 is in a non-conducting condition no resistance appears across resistor 105 and the effective resistance in series with capacitor 98 is that of resistor 105 along. The transistor 120 is brought into conduction by transistor 123. It will be seen that the input to the base of transistor 123 comes from the wiper arm of the steering potentiometer. In the central position of the wiper arm, a potential is applied to the base of transistor 123 and the current flowing in this transistor is effectively given by the voltage at the wiper arm of the potentiometer divided by the value of the resistor 144. This current causes base current to flow in the transistor 120, thus turning transistor 120 into a conducting condition. As the wiper arm of the steering potentiometer 125 is moved so that the potential thereof falls, transistor 123 is progressively turned off and so therefore is transistor 120. In the limit when the potential and the wiper arm is that of the negative side of the battery, the transistor 123 is fully turned off and so is transistor 120. Accordingly, by varying the potential at the base of transistor 123, the effective resistance appearing across resistor 105 is varied. Thus the delay between the initiation pulse delivered to the delay circuit 8 by the master oscillator and the pulse delivered by the circuit 8 to the gate electrode of the main thyristor 4 is varied.

The differential circuit which acts on the delay circuit 9 is generally similar to that described in relation to the delay circuit 8.

The pulse delay effected by the pulse delay circuit 8 or the pulse delay circuit 9 does not vary linearly with variation of the steering angle. It is for this reason and because the response of the pulse delay network is non-linear that the non-linear network 121 is provided. This network may consist simply of a voltage dependent resistore, or alternatively, of a resistor chain extending from the rail 32 with diode and resistor paths at intervals along the resistor chain feeding into the emitter of transistor 120 and also the emitter of a transistor corresponding with transistor 120 and forming part of the differential circuit associated with the pulse delay circuit 9. Non-linear networks of the kind described are well-known and need not further be described.

Figure 6:
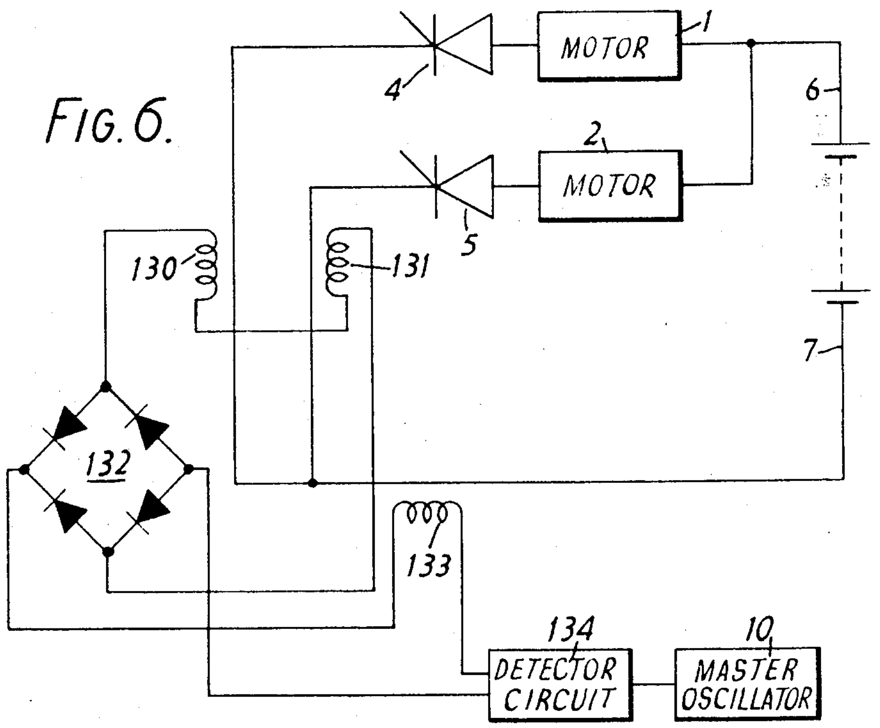
FIG. 6 illustrates a circuit for limiting current through the motors of the system illustrated in FIG. 1.

It is necessary in order to avoid overloading of the main thyristors 4 and 5 to provide for limitation of the current therethrough and the manner in which current limitation is provided is shown in FIG. 6 of the accompanying drawings. On commutation of the main thyristors a voltage peak appears across each of the thyristors of magnitude (less the battery voltage) proportional to the current flowing when the thyristor is commutated. The voltage peak appearing across the thyristors 4 and 5 is made to cause current flow by mutual inductance in respective pick-up coils 130 and 131 placed adjacent the main current conductor in series with the corresponding thyristors. The two pick-up coils 130 and 131 are connected in phase opposition across the input to a full wave rectifier bridge 132 the output of which is connected, in series with a further pick-up coil 133 (which senses changes in the main battery-current and is disposed adjacent the main conductor 7 connected to the battery) to the input of a current limit detector circuit 134 in which the negative peaks which occur on switching on the thyristors 4 & 5 are removed whilst the peaks which occur on the switching off of these thyristors are amplified and compared with a standard voltage derived from a stabilised source such as a zener diode. It will be apparent that when the two motor currents are equal the input to the full wave rectifier 132 is zero and the output supplied to the current limit detector 134 will be simply that of the pick-up coil 133 near the battery main conductor 7, the current limit detector being adjusted to respond to a given voltage. In the case of different current flows in the two motors the input from the pick-up coils 130 & 131 to the full wave rectifier bridge is not zero and due to the action of the rectifier bridge 132 is added to the current in the coil 133 which detects changes in battery current and the voltage input to the current limit detector 134 is increased. The output voltage of the current limit detector is fed to the master oscillator 10 supplying pulses to the main thyristors and when the output voltage from the current limit detector rises above a predetermined value the frequency of the master oscillator commences to reduce thus reducing the current drawn from the battery. In the limit when the current drawn by one of the motors is zero, as may occur when a sharp bend is being negotiated, the input voltage to the current limit detector 134 is the sum of the voltage in the pick-up coil 133 detecting changes in the battery current and the rectified voltage in the pick-up coil 130 and 131 detecting the switching of the main thyristor in series with the other motor. This input to the current limit detector produces an output from the detector which limits battery current to a suitable safe proportion of its previous value that is to say its value when both motors were equally drawing current from the battery.

As an alternative to the current limit system described only two pick-up coils may be utilised, the coils being each associated with one of the main thyristors and not being interconnected. The coils supply respective pulse delay networks associated each with one of the main thyristors. It will be appreciated that a change in current through one of the pick-up coils causes the associated delay network in which the coil signal is compared with a reference signal to vary the width of pulses supplied to the relevant main thyristor. When the coil current increases above a predetermined value, the pulse width of the main thyristor firing pulse is narrowed and the mean current through the corresponding motor is reduced.

The simultaneous commutation of the main thyristors in series with the respective motors can be accomplished in different ways from that described with reference some of which will now be described.

Figure 7:
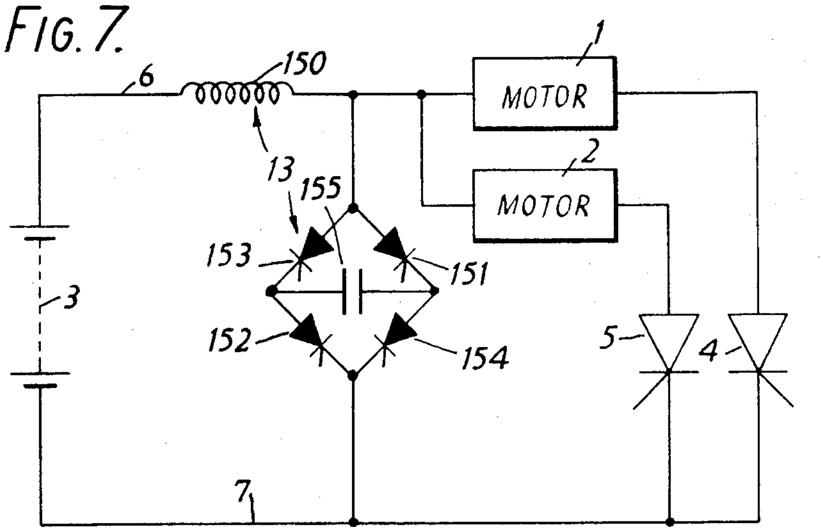
FIGS. 7 to 9 illustrate other forms of commutating circuits which can be employed in the system of FIG. 1.

First referring to FIG. 7 of the accompanying drawings, a capacitor charging inductor 150 is placed in series with the battery to form a branch connected across which are the parallel connected arms which each comprise one of the motors 1 and 2 shunted by the customary so-called freewheel diode and in series with the associated main thyristor 4 or 5. Also connected in parallel across the series branch formed by the battery and capacitor charging choke is a bridge network of four thyristors 151, 152, 153 and 154. A capacitor 155 is connected to the thyristors of the bridge so that when the thyristors in either pair of opposed arms of the bridge are rendered conducting a conducting path is connected in series with the battery 3 and chock 150 which comprises in sequence the thyristor of one arm of the pair of opposed arms of the bridge, the capacitor 155 and the thyristor in the other arm of the pair of opposed arms of the bridge.

The operation of the circuit described is as follows. First the bridge thyristors e.g. thyristors 151 and 152 of opposed arms of the bridge are simultaneously rendered conducting by pulses supplied to their gate electrodes by a separate oscillator. The capacitor 155 is thus Inductively forward charged to a voltage level above the battery and at the completion of the charging process the two bridge thyristors which conduct the charging current are effectively extinguished. The main thyristors 4 and 5 respectively in series with the motors 1 and 2 are then rendered conducting as described above either simultaneously or in sequence. The bridge thyristors 153 and 154 of the other pair of opposed bridge arms are then simultaneously rendered conducting by pulses supplied to their respective gate electrodes from the separate master oscillator. The negatively charged side of the capacitor is thus connected to the end of the inductor 150 connected to the parallel motor circuits. Because of the high impedance of the inductor during the commutation period, the capacitor 155 reverse biasses the main thyristors 4 & 5 associated with the motors thereby effectively and simultaneously commutating them. The capacitor 155 then inductively charges in the reverse direction to a voltage level higher than the battery and as the capacitor reaches its full reverse charge the bridge thyristors conducting the reverse charging current are extinguished. The process is then repetitive and it will thus be seen that the commutation of the main thyristors is effected simultaneously by a single commutating network. The freewheel diodes as is well-known serve to maintain current flow in the motors in the interpulse period and also prevent the self-inductance of the motors maintaining current flow through the main thyristors during the commutation period.

Figure 8:
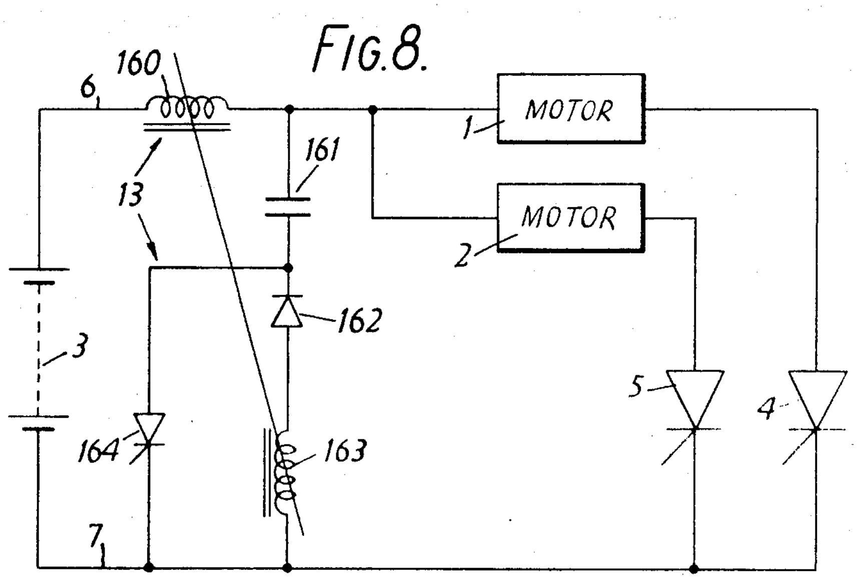

Referring now to the commutating network shown in FIG. 8, the inductor in series with the positive side of the battery comprises a transformer primary winding 160 and across the series branch of the battery and transformer primary winding is connected a series branch comprising a capacitor 161, a diode 162 and the secondary winding of the transformer 163, the diode being present to prevent leakage of charge from the capacitor. Shunting the diode 162 and the transformer secondary winding 163 is a further thyristor 164. As before the parallel connected arms which each include one of the motors and its associated main thyristor are connected across the series branch of the battery 3 and its series inductor 160 which in this case is the primary winding of the transformer. The operation of this circuit is as follows: the battery current pulse which is taken by both or either of the motors 1 and 2 when the or either of the main thyristors 4 and 5 are conducting is employed by transformer action to charge the capacitor 161 so that the capacitor plate connected to the transformer primary winding 160 is negatively charged whilst the other plate of the capacitor which via the diode 162 is connected to the transformer secondary winding is positively charged. The magnitude of the capacitor charge depends on the battery current and the transformer charcteristics. The further thyristor 164 is then rendered conducting by a pulse supplied to its gate electrode from a separate oscillator. In its conducting state the further thyristor connects the positive plate of the capacitor to the negative side of the battery so that the other plate of the capacitor is driven negative with respect to the negative side of the battery, this being possible by virtue of the self-inductance of the transformer primary winding which has a high impedance at this frequency. As the capacitor plate which is connected to the transformer primary winding 160 is thus driven negative the main thyristors 4 and 5 are reverse biassed and, therefore, simultaneously commutated. The process is then repetitive on one or both of the main thyristors being again rendered conducting. It may be better to substitute for the diode 162 an additional thyristor which is fired into conduction, when one or both of the main thyristors 4 and 5 is rendered conducting by a pulse from the oscillator controlling the main thyristors or from a separate oscillator. The presence instead of the diode of the additional thyristor avoids any possibility of the secondary winding of the transformer being short circuited during commutation, i.e., during conduction of the further thyristor 164. Short circuiting of the transformer secondary winding as is well-known results in negligible inductance in the primary winding whereas high primary inductance during commutation is essential.

Figure 9:
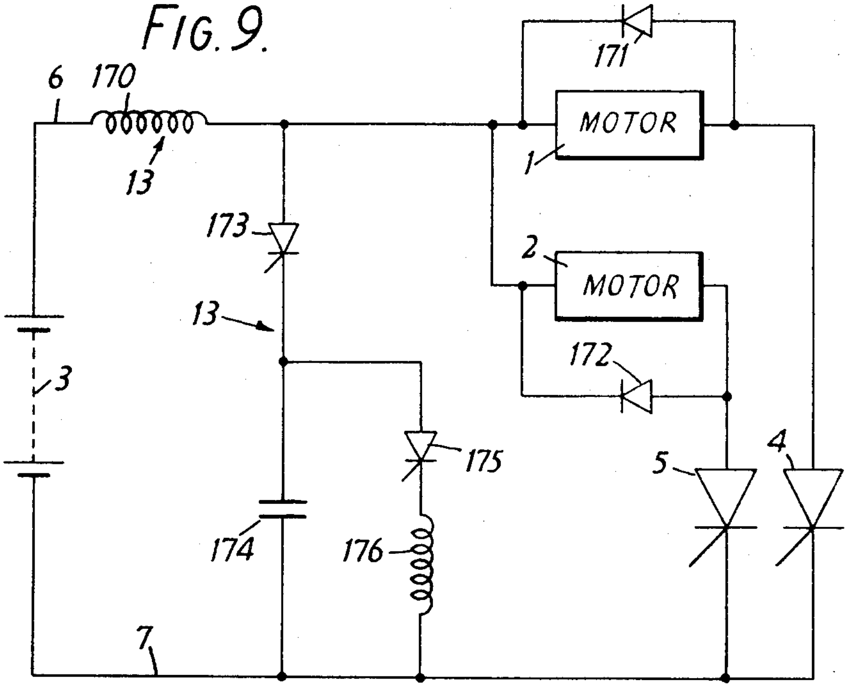

A further commutating network is seen in FIG. 9 which shows a first inductor 170 disposed in series with the positive side of the battery. Across the battery and first inductor are connected the parallel arms each of which consist of one of the motors 1 or 2 in series with its associated main thyristor 4 or 5. Each motor is shown as being shunted with the well-known so called freewheel diode 171 and 172, normally associated with an inductive load, to ensure current flow is maintained in each motor between commutation and re-firing of the associated main thyristor.

Also connected across the battery 3 and first inductor 170 is a further thyristor 173 in series with a capacitor 174, the capacitor being shunted by another thyristor 175 in series with a second inductor 176. In operation, assume that initially the main thyristors 4 and 5 are non-conducting and that the further thyristor 173 in series with the capacitor 174 is pulsed into conduction from a separate oscillator. The capacitor 174 thus charges by way of the first inductor 170 and further thyristor 173 to a level above the supply potential. As the capacitor 174 reaches its full charge the further thyristor 173 is extinguished. The main thyristors 4 and 5 are then either simultaneously or sequentially rendered conducting by the master oscillator in the manner earlier described and at some time before or after the main thyristors are rendered conducting the thyristor 175 in series with the second inductor 176 is pulsed into conduction either from the master oscillator controlling the main thyristors or from a separate oscillator. The capacitor 174 is thus reverse charged by the second inductor and when it reaches its full reverse charge the thyristor 175 in series with the second inductor is extinguished. At the termination of a fixed period the further thyristor 173 which is in series with the capacitor is again rendered conducting so that the reverse charge on the capacitor is presented across the battery and first inductor. This effectively reverses the potential at the junction of the further thyristor 173 and the first inductor 170 so that the diodes 171 and 172 shunting the motors and the main thyristors 4 and 5 are effectively reverse biassed and therefore the main thyristors are simultaneously commutated. The capacitor then again is forward charged by the battery and the first inductor 170 by way of the further thyristor 173 and the cycle of the process then repeats.

It should be noted that the circuit of FIG. 2 has the advantage over the arrangement of FIG. 9 in that the charge on the commutating capacitor 18 is not as load dependent as is that on the commutating capacitor 174 of the FIG. 9 arrangement. Also the charge of commutating capacitor 18 is usefully utilised to supply power to the motors and this is not the case with the described circuit of FIG. 9. The circuit arrangement of FIG. 2, it will be noted, and particularly the common diode 20, prevents short circuiting of the battery being able to occur.

Those skilled in the art will appreciate that though the vehicle drive system described above, particularly in relation to FIGS. 1 to 5 achieves the supply of different driving power to the two motors by maintaining the power to one motor constant whilst varying the power to the other motor, the circuitry could equally well be adapted so that the power to one motor was increased the power supplied to the other motor was correspondingly reduced and vice versa.

Although the embodiments hereinbefore described have been described with reference to the control of the traction motors of an electrically-driven vehicle, the invention is equally applicable to the case where it is required to control any electrically-operated drive system in which there are two D.C. electric motors which require to be supplied under certain conditions of operation with different driving power. Thus, for example, the embodiment described in FIGS. 1 to 5 can very simply be adapted to control the electric motors of a fork lift truck having a single traction motor and a motor for driving the hydraulic pump which effects operation of the auxiliary services of the vehicle, e.g. the raising and lowering of the load, the tilting of the fork carriage supporting mast, etc. For this application of the invention the foot control resistor 11 is replaced by a preset resistor which sets the master oscillator to its maximum frequency. Also, instead of the potentiometer 125 there are provided two separate potentiometers, one controlling the input to the transistor 123 of delay circuit 8 and the other controlling the input to a corresponding transistor of delay circuit 9. One of the potentiometers, for example potentiometer 125, has its wiper arm coupled to the foot control of the vehicle and since the master oscillator is set to operate at maximum frequency the initia' setting of the foot control potentiometer is such as to produce the maximum delay between the initiation of a pulse from the master oscillator and the firing pulse from the delay circuit 8 to the thyristor 4. This gives a minimum pulse width to the traction motor and further depression of the foot pedal acts progressively to reduce the delay and thereby increases the pulse width until ultimately there is no delay and the traction motor is operating at maximum pulse width and maximum frequency.

The potentiometer corresponding with potentiometer 125 which is associated with the delay circuit 9 has its wiper arm coupled to the hydraulic level of the vehicle. The initial setting of the hydraulic lever is again such as to give maximum delay between the initiation of a pulse from the master oscillator and the supply of a pulse from the delay circuit 9 to the main thyristor 5. Progressive movement of the lever then reduces the delay and, accordingly, increases the pulse width so that the pump motor is supplied with greater power and the pumping rate of hydraulic fluid is accordingly increased.

It will be seen, therefore, that the speed of the two motors can be varied simultaneously or independently.

Another application of the embodiment of the invention just described would be to the traction motors of a track-laying vehicle in which separate motors control the speed of the track at the respective sides of the vehicle. In this instance the two potentiometers acting on the delay circuits 8 and 9 would be coupled to respective levers which could be operated simultaneously or independently. It will be apparent in this case that a track-laying vehicle can be provided which is able to turn in little more than its own length.

It will be apparent to those skilled in the art that the drive systems described above can be applied instead of to the control of D.C. series motors, to the control of D.C. motors, the speed of which are controlled by controlling the field circuits thereof instead of the armature circuits.

We claim:

1. An electrical circuit for energizing a plurality of d.c. loads from a d.c. source, which circuit comprises:

a plurality of main semi-conductor switching devices, one for each load, each connected with its load to effect repetitive connection of its load to the d.c. source and disconnection of its load therefrom; means for firing said main semi-conductor switching devices substantially independently of one another so that the several loads can be connected with the d.c. source either simultaneously or at different times; a commutating capacitor;

means for inductively charging said capacitor; and further semi-conductor switching means whereby said commutating capacitor can be connected with all of the main semi-conductor switching devices when the latter are conducting and thereby reverse bias and commutate all of said main devices simultaneously.

2. Circuit means as claimed in claim 1, further characterized by: means defining a discharge path of the commutating capacitor, operative during commutation of the main semi-conductor switching devices, which discharge path comprises the loads.

3. Circuit means as claimed in claim 1, wherein the loads are inductive and each load has a free wheel path which comprises a unidirectional conduction device and which affords maintenance of current flow through the load when its main semi-conductor switching device disconnects it from the d.c. source, and the discharge path of the commutating capacitor during commutation includes the loads and respective unidirectional conduction devices in the free wheel paths of the loads.

4. Circuit means as claimed in claim 1, further characterized by: a transformer having a primary winding connected in series between the d.c. source and the commutating capacitor to present a high impedance path during commutation and having a secondary winding connected with the commutating capacitor for the latter to be inductively charged therethrough.

5. Circuit means as claimed in claim 1, wherein said means for firing the main switching devices substantially independently of one another comprises: a master electrical oscillator for supplying output trains of electrical pulses; a plurality of pulse delay circuits, one for each main semi-conductor switching device, each connected with its switching device; and means for varying the delay of at least one of the pulse delay circuits so that the main switching devices can be switched on at different times and by reason of their simultaneous commutation can conduct current from the d.c. source to their respective loads for different periods.

* * * * *

UNITED STATES PATENT OFFICE
CERTIFICATE OF CORRECTION

Patent No. 3,757,140 Dated September 4, 1973

Inventor(s) David Gurwicz and Albert E. Sloan

It is certified that error appears in the above-identified patent and that said Letters Patent are hereby corrected as shown below:

On the Title Page:

The names of the assignees should read:

Ransomes Sims & Jefferies Limited,

Ipswich; Sevcon Engineering Limited,

Gateshead, both of England

Signed and sealed this 1st day of January 1974.

(SEAL)
Attest:

EDWARD M.FLETCHER,JR.
Attesting Officer

RENE D. TEGTMEYER
Acting Commissioner of Patents